United States Patent [19]
Kojima et al.

[11] 4,392,026
[45] Jul. 5, 1983

[54] SUBSCRIBER LINE TESTING SYSTEM

[75] Inventors: Takafumi Kojima; Kenzo Tamaki, both of Yokohama; Shiro Yokota, Tokyo, all of Japan

[73] Assignees: Hitachi, Ltd.; Nippon Telegraph & Telephone Public Corporation, both of Tokyo, Japan

[21] Appl. No.: 309,400

[22] Filed: Oct. 7, 1981

[30] Foreign Application Priority Data

Oct. 8, 1980 [JP] Japan .......................... 55-139868

[51] Int. Cl.³ .......................... H04B 3/46; H04M 3/30
[52] U.S. Cl. ...................... 179/175.3 R; 179/175.2 D
[58] Field of Search ................ 179/175.3 R, 175.2 R, 179/175.2 D, 18 R, 18 A; 324/54

[56] References Cited

U.S. PATENT DOCUMENTS 4,076,971 2/1978 Mukaemachi et al. ...... 179/175.3 R

Primary Examiner—Stafford D. Schreyer
Attorney, Agent, or Firm—Antonelli, Terry & Wands

[57] ABSTRACT

A system for testing subscriber lines and terminals by leading the subscriber line to the testing system through an associated semiconductor switch of a type driven by a constant current. The system includes a circuit for varying a current fed through the switch from the subscriber line to be tested, a circuit for measuring current values corresponding to the circuit states of the circuit, and a circuit for determining on the basis of the measured values derived from the measuring circuit a current value from which the constant current component for driving the switch is eliminated.

13 Claims, 7 Drawing Figures

SUBSCRIBER LINE TESTING SYSTEM

The present invention relates to a testing system for performing tests of subscriber lines and associated terminal equipments of a telephone exchange system by electrically connecting the subscriber line to be tested to a tester apparatus by way of an associated test leading switch. More particularly, the invention concerns a system for conducting the tests by leading-in the subscriber line to be tested through a semiconductor switch of a type driven by a constant gate current and serving as the test leading switch.

For testing the subscriber line as well as the associated terminal of a telephone exchange system, there has heretofore been used a test leading switch constituted by mechanical switches such as relay contacts or the like and provided in the subscriber circuit. By leading the subscriber line to be tested to the testing apparatus or system through selecting operation of the test leading switch, the test is performed to determine presence or absence of failures in the subscriber line and/or the associated terminal on the basis of the result of measurement of the current fed from the subscriber line. Although the testing performed with the aid of the mechanical switches can be effected in a facilitated manner, there arise difficulties in implementing the subscriber circuit in a miniature size with low manufacturing cost and power consumption. It will be appreciated that such difficulties are serious when considering the fact that an enormous number of the subscriber circuits are provided in a telephone exchange system. With the recent remarkable development of semiconductor integrated circuit technology, attempts and approaches have been made to implement the subscriber circuits and the time division switching network by using semiconductor devices. However, the use of the mechanical switch as the test leading switch makes it impossible to realize the subscriber circuit in a monolithic structure. Thus, there are problems remaining to be solved in attaining a high package density and a low power consumption.

Under the circumstances, there is a great demand for realization of a subscriber line testing system which is immune to the drawbacks described above and which is capable of miniaturization as well as inexpensive manufacture. To meet such demand, it may occur to those skilled in the art to use a semiconductor switch of four-layer or multi-layer structure such as a thyristor as the test leading switch with the view to attaining the desired miniaturization and low cost while increasing the package density. However, when a thyristor or the like element is employed as the test leading switch, it is necessary to supply continuously a gate drive current even after the thyristor switch is closed to prevent the switch from opening under certain conditions. More particularly, because of its inherent self-holding property, the thyristor switch under most conditions will self-hold even when the gate driving current is terminated after the conduction of the thyristor (i.e. after the closure of the switch). However, when a very small current is being conducted, as is in the case of the measurement of insulation resistance, or when the direction of the current flowing through the semiconductor switch is reversed, the semiconductor or thyristor switch will be opened in spite of its inherent self-holding property unless the gate driving current is maintained. Thus, in order to hold the semiconductor switch in the conducting state notwithstanding a very small magnitude or polarity inversion of the current flowing through the thyristor switch, it is required to supply continuously the gate driving current to effect the closure of the switch. This gate current will then flow into the speech circuit or test loop to give rise to problems or difficulties in the subscriber line test, as will be described below.

The problems of tests affected by the gate driving current depends on the magnitude of the latter. Mainly, difficulties are encountered in the case of (1) measurement of insulation resistance and (2) measurement of the external voltage.

In the measurement of the insulation resistance of a subscriber line, a measuring circuit composed of a cell, a D.C. ampere meter and the like is connected to the connection terminals of the semiconductor switch to feed a current through the semiconductor switch to the subscriber line to be tested. On the basis of the relationship between the voltage and the current available from the measuring circuit, it is primarily determined whether there is an imperfection in the insulation of the subscriber line. In this connection, it should be noted that the current available from the measuring terminals or semiconductor switches corresponds to a sum of the inherent measuring current providing a measure of the insulation resistance and the gate driving current introduced to the speech channel and hence to the test loop. Thus, it is obvious that the result of the insulation measurement represents a resistance value which is smaller than the actual resistance value of the subscriber line. So far as the gate driving current remains constantly at a predetermined value, the true or actual resistance value may be determined through appropriate correction of the measured resistance value. However, since the gate drive current becomes necessarily different from one to another of the semiconductor switches due to inevitable unevenness in the performances of the individual switches as employed, large errors may be involved in the results of measurement, rendering occasionally the measurement to be unreliable.

In more particular, the gate driving current of a thyristor will be considered in terms of a leakage resistance. The gate current is generally in the range of 0.05 mA to 1 mA although it varies in dependence on the gate sensitivity of the semiconductor switch. When such thyristor is employed in a single-stage connection (i.e. in the minimum number of connecting stage), the leakage resistance will be in the range of 500 k$\Omega$ to 25 k$\Omega$ ($=50/2\times0.05$ to 1) on the assumption that the source voltage of the measuring circuit is 50 V. On such condition, it is practically impossible to measure the insulation resistance on the order of several hundred k$\Omega$ to several M$\Omega$ which is connected in parallel to the leakage resistance in the measurement.

In the measurement of the external voltage, an ampere meter or the like instrument is connected in series to the subscriber line through the test leading switch, whereby determination is made as to the presence of confused contact between power lines, consumption of the battery and the like on the basis of the indications provided by the ampere meter. It will be self evident that the measurement of the external voltage is rendered very difficult and eventually impossible for the same reasons as described above in conjunction with the measurement of the insulation resistance.

In this way, the exchange system in which the semiconductor switch elements of the constant current drive type are employed suffers a problem that the subscriber line tests such as measurements of the insulation resistance and the external voltage are very difficult.

The conventional subscriber line testing system using semiconductor switch elements of the constant current drive type is known from U.S. Pat. No. 4,076,971 owned by the present assignee. However, in the prior art digital exchanger for which the testing system is used, a direct current is inhibited from flowing into the channel, so that no test by leading-in the subscriber line can be performed. In the referenced U.S. patent, at least two switches and a floating current source are required for one wire to be tested. Accordingly, the number of components required in the subscriber circuit increases and hence, it has a problem in economy and miniaturization.

An object of the present invention is to provide a subscriber line testing system for a telephone exchange system which can be inexpensively implemented in a small size and assure a high measurement accuracy.

Another object of the present invention is to provide a subscriber line testing system which can be packaged with a high density and operated with a reduced power consumption.

Still another object of the present invention is to provide a subscriber line testing system which allows measurements to be accomplished within a shortened period with an improved reliability.

According to an aspect of the present invention, connection is formed between the subscriber line to be tested and the testing apparatus with the aid of a semiconductor switch circuit of a constant current drive type serving as a test leading switch. Subsequently, the current flowing through the subscriber line is varied or changed over by means of a current change-over circuit provided in the testing apparatus, and the currents of varied levels are measured by a current measuring circuit. On the basis of the measured currents, only the measuring current flowing through the subscriber line is determined through arithmetic processing for eliminating the constant drive current component.

Figure 1:
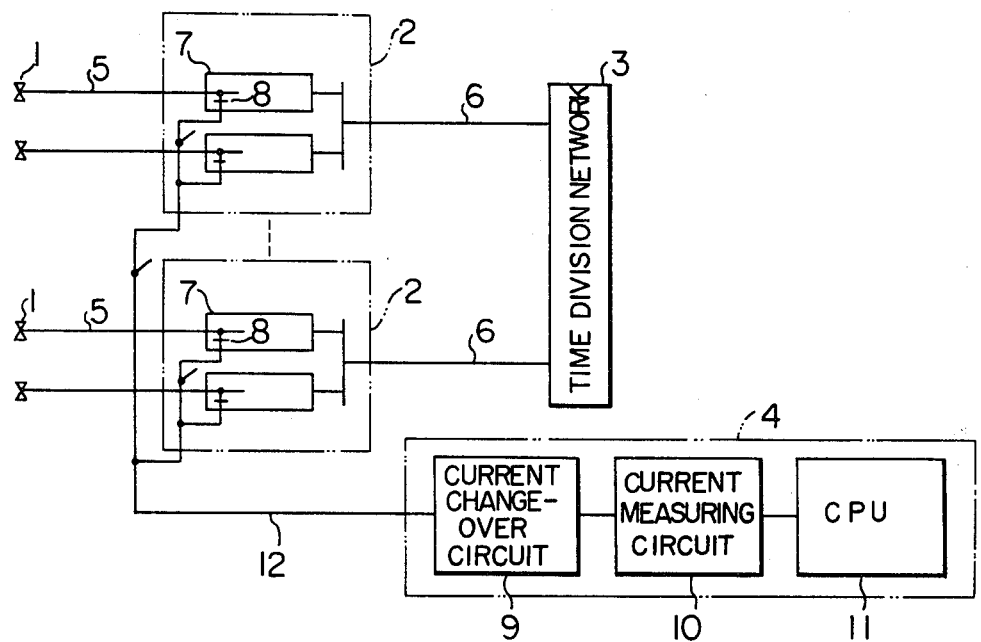
FIG. 1 is a block diagram showing schematically a general arrangement of a telephone exchange system in which the subscriber line testing system according to an embodiment of the invention is employed.

In the first place, referring to FIG. 1, description will be made on a general arrangement of a telephone exchange to which a subscriber line testing system according to an exemplary embodiment of the present invention can be applied. In FIG. 1, a reference numeral 1 denotes subscriber terminal equipments, 2 denotes time division line concentrator units, 3 denotes a time division switching network, 4 denotes a testing apparatus, 5 denotes subscriber lines, and 6 denotes highways. There are provided in each of the time division line concentrator units 2 a plurality of subscriber circuits 7 and testing leading switches 8, wherein each of the subscriber lines is led to the testing apparatus 4 by way of the associated test leading switch 8 and lead-in line 12. The testing apparatus 4 comprises a current change-over circuit 9 for varying a current fed from the subscriber line 5, a current measuring circuit 10 for measuring the values of current output from the current change-over circuit 9, and a processing circuit 11 for storing and arithmetically processing the results of measurements on the basis of the signal output from the current measuring circuit 10.

Describing briefly the operation of the system outlined above with reference to FIG. 1, the test of the subscriber line 5 is effected by selectively activating the associated test leading switches 8 and varying the current flowing through the subscriber line 5 by means of the current change-over circuit 9, the current values as varied then being measured by the current measuring circuit 10. The result of measurement is transferred to the processing circuit 11 for being stored therein and undergoing arithmetic operation or processing. The result of the arithmetic operation is displayed on a CRT (cathode ray tube) display unit (not shown). In this manner, it can offhand be determined whether or not failure is present in the subscriber line being tested. A plurality of the subscriber lines can be sequentially tested periodically by taking advantage of the time when the traffic to be processed by the exchange is low. To this end, date and time for performing the test as well as the subscriber numbers and other items as required may be previously programmed. Of course, it goes without saying that the tests may be carried out individually and separately, when occasion requires. Next, exemplary embodiments of the individual circuits or units as well as various testing methods or processes will be described in detail.

Figure 2:
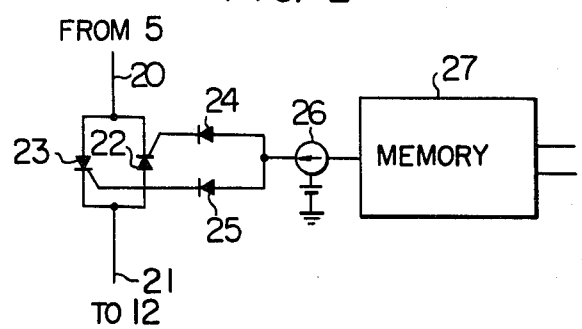
FIG. 2 is a circuit diagram showing a cross-point circuit in which semiconductor switching elements serving as a test leading switch according to the invention are connected.

FIG. 2 shows an exemplary embodiment of the test leading switch circuit 8 shown in FIG. 1. More specifically, there is shown in FIG. 2 a circuit diagram of a bi-directional semiconductor switch circuit which constitutes a single crosspoint (for only one wire), wherein a reference numeral 20 denotes an incoming line, 21 denotes an outgoing line, 22 and 23 are crossover thyristors, 24 and 25 denotes backward gate current preventing diodes for the thyristors 22 and 23, respectively, a numeral 26 denotes a constant current driver circuit for driving the gates of the crosspoint thyristors 22 and 23, respectively, and finally the reference numeral 27 denotes a memory for holding the constant current driver circuit 26 during the period in which the test leading switch 8 is closed.

Figure 3:
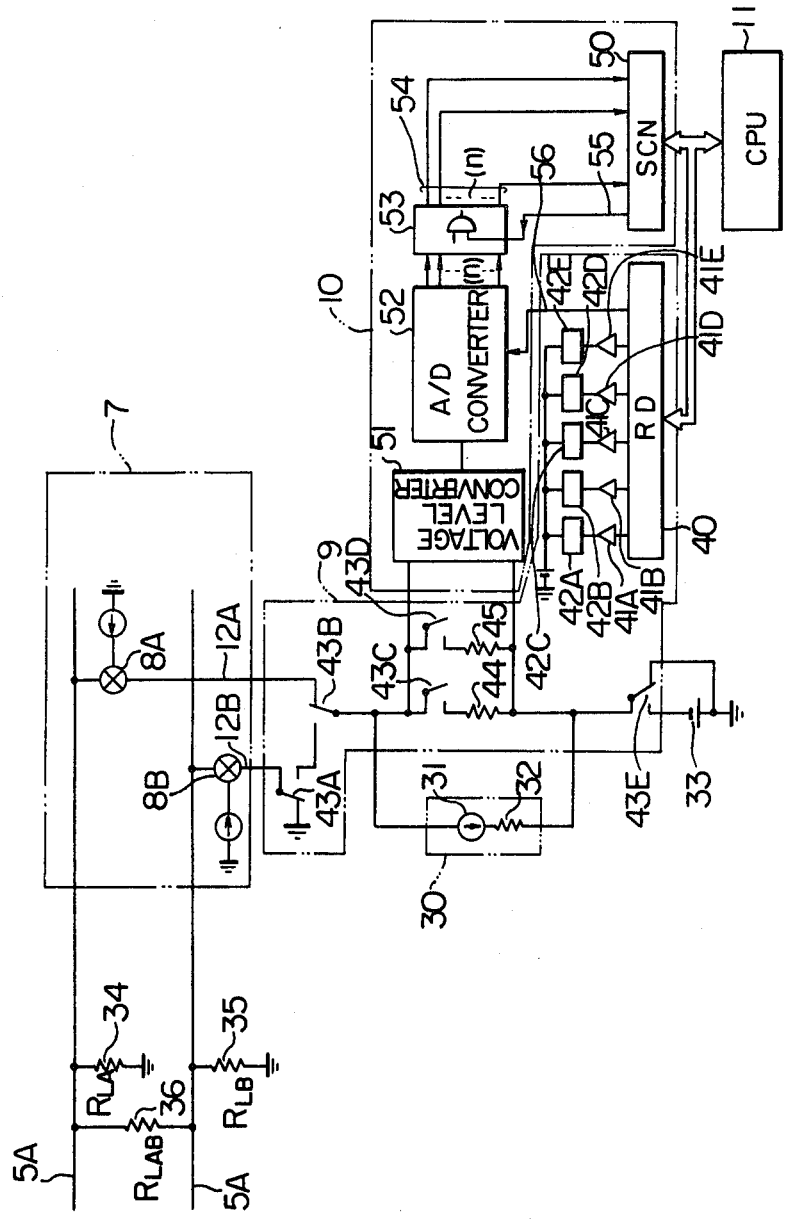
FIG. 3 is a circuit diagram showing in detail a circuit arrangement of the subscriber line testing system according to an embodiment of the invention.

Next, a circuit arrangement and operation of the testing system according to an embodiment of the invention will be described by referring to FIG. 3, in which the same elements as those shown in FIG. 1 are denoted by the same reference numerals. In FIG. 3, the subscriber line 5 (FIG. 1) is constituted by a pair of A- and B-wires 5A and 5B. Insulation resistances $R_{LA}$ and $R_{LB}$ of these subscriber wires 5A and 5B are represented by resistors 34 and 35, respectively, while an insulation resistance $R_{LAB}$ between the wires A and B is represented by an inter-wire resistor 36. The subscriber circuit generally denoted by the reference numeral 7 includes the test leading switches 8A and 8B for testing the A-wire 5A and the B-wire 5B of the subscriber line 5. Each of these switches 8A and 8B can be implemented in the circuit configuration shown in FIG. 2. The current change-over circuit 9 shown in a dotted line block includes a relay driving (RD) circuit 40 for selectively driving relays in accordance with instructions or commands issued from the processing circuit (CPU) 11, and drivers 41A and 41E for driving selectively associated relays 42A to 42E in accordance with the selection made by the relay driving (RD) circuit 40. Reference letters 43A to 43E denote contacts of the relays 42A to 42E, respectively. Further, numerals 44 and 45 denote measuring resistors having different resistance values. The measuring circuit shown as enclosed by a dotted line block 10 includes a scanner circuit (SCN) 50 which is adapted to receive a scanning command from the processing circuit (CPU) 11 on one hand and message the result of the scanning operation to the processing circuit (CPU) 11, a voltage level converter circuit 51 for effecting a level conversion of the measured voltage, an analog-to-digital or A/D converter for converting the analog voltage level produced from the voltage level converter 51 into a corresponding digital value, and a scanning type read circuit 53 for fetching the output digital signals from the A/D converter 52. A reference numeral 54 denotes a read signal line, 55 denotes a scan enabling line, and a numeral 56 denotes a control line. Further, a dotted line block 30 represents a gate current bypass circuit which serves to bypass a part of the gate current for driving the test leading switch 8A or 8B with a constant current. The gate current bypass circuit 30 includes a constant current circuit 31, a resistor 32 and a measuring current source 33.

At first, description will be made on the measurement of the insulation resistance ($R_{LA}$) 34 of the A-wire 5A of the subscriber line 5.

In this case, the subscriber line 5 to be measured or tested is connected to the testing apparatus 4 (refer to FIG. 1) through the associated test leading switch 8A closed by a control circuit (not shown). More particularly, the memory 27 shown in FIG. 2 is turned on, to supply the gate current to the switch elements or thyristors 22 and 23 constantly from the gate driving constant current circuit 26, resulting in the switching elements 22 and 23 being rendered conductive in dependence on the cathode potential. In this assumed case, the test leading switch 8A is thus turned on. Simultaneously, a setting command for measuring the isolation resistance of the subscriber line wire 5A is sent out from the processing circuit 11 to the relay driving circuit 40, whereby the relays 42A and 42E are selected and energized. Subsequently, the relay 42C is energized for a first measurement. Upon operation of the relay 42C, a current loop is established which extends from the ground, through the resistor 34, the switch 8A, the lead-in wire 12A, the relay contact 43B, the relay contact 43C, the resistor 44, the relay contact 43E, the current supply source 33 and back to the ground, as the result of which measuring current can flow through the insulation resistor 34 or resistance $R_{LA}$. At that time, the constant gate current for driving the switch 8A flows towards the current supply source 33 in a circuit path extending from the switch 8A to the ground through the lead-in wire 12A, the relay contact 43B, the relay contact 43C, the resistor 44, the relay contact 43E and the current supply source 33. It should be noted that the gate current is partially bypassed through the gate current bypassing circuit 30 with a view to facilitating implementation of the measuring circuit and enhancing the accuracy of measurement. In other words, a part of the gate current flow corresponding to a minimum current value which may be determined in consideration of unevenness in performances of the individual circuit elements as employed is bypassed through the constant current circuit 31 of the bypass circuit 30. As a consequence, the resistor 44 is traversed by the measuring current and the remaining part of the gate current, wherein a voltage drop appearing across the measuring resistor 44 is measured by means of the measuring circuit 10. More particularly, after elapse of a time duration in which the measuring voltage has become saturated, as determined through monitoring effected under a predetermined timing, a command for initiating the analog-to-digital conversion of the A/D converter circuit 50 is issued from the processing circuit (CPU) 11 through the relay driving circuit (RD) 40 and the control line 56. Thus, the voltage value derived from the output of the voltage level converter circuit 51 is converted into a corresponding digital value through the A/D converter circuit 52. The digital value outputted from the A/D converter 52 is fetched by the sampling circuit 53 in accordance with the sampling command signal supplied thereto from the processing circuit or CPU 11 through the scanner circuit 50 and the sampling signal lines 54. The digital value thus sampled or read is then messaged through the scanner circuit or SCN 50 to the processing circuit (CPU) 11 for temporal storage therein.

For the second measuring cycle, the relay 42C is reset, while the relay 42D is activated. At this time, the measuring current and a part of the gate current flow in a circuit loop similar to the one described above except that the measuring resistor 45 is inserted in place of the resistor 44. The voltage drop appearing across the resistor 45 is measured, the result of which is temporarily stored in the processing circuit 11 through the A/D conversion and the scanning/sampling operation similar to those described above. Subsequently, the processing circuit or CPU 11 performs an arithmetic operation to determine the value of the isolation resistance ($R_{LA}$) 34 of the subscriber wire 5A on the basis of the data obtained through the first and the second measurements.

Next, it is assumed that the isolation resistance value $R_{LB}$ (resistor 35) of the B-wire 5B of the subscriber line 5 is measured.

In this case, the test leading switch 8B is closed in a similar manner as in the case of the aforementioned measurement of the isolation resistance of the subscriber wire 5A. On the other hand, the relays 42A, 42B and 42E are energized in accordance with the command signals issued from the CPU 11 to establish the conditions for measuring the insulation resistance of the subscriber wire 5B. Subsequently, the relay 42C is activated for the first measurement, resulting in the current path for the current representative of the isolation resistance $R_{LAB}$ of the resistor 35 being established from the ground through the resistor 35, the switch 8B, the lead-in wire 12B, the relay contacts 43A, 43B and 43C, the resistor 44, the relay contact 43E and the power supply source 33 back to the ground. Further, the gate current for driving the switch device 8B with the constant current also flows toward the power supply source 33. Thereafter, the voltage drop appearing across the resistor 44 is measured by the measuring circuit 10, the result of which is temporarily stored in the processing circuit or CPU 11.

For the second cycle of measurement, the relay 42C is deenergized, while the relay 42D is energized, whereby the measuring resistor 45 is inserted in place of the resistor 45. Through the similar procedures as described above, the voltage drop produced across the resistor 45 is measured, the result of which is loaded in the CPU 11 for temporary storage. The processing circuit or CPU 11 performs subsequently the arithmetic operation as required for determining the value of the isolation resistance $R_{LB}$ or resistor 35 on the basis of the data obtained through the first and the second measurements.

In a similar manner, for the measurement of the inter-wire insulation resistance $R_{LAB}$ (represented by the resistor 36) existing between the A-wire 5A and the B-wire 5B of the subscriber line 5, the relay 42E is energized in response to a corresponding command issued from the CPU 11 to thereby establish the current path extending from the earth through the relay contact 43A, the lead-in wire 12B, the switch 8B, the resistor 36, the switch 8A, the lead-in wire 12A, the relay contacts 43B and 43E and the power supply source 33 back to the ground. The resistance value ($R_{LAB}$) of the inter-wire resistor 36 can be determined through successive measurements of the voltages produced across the resistors 44 and 45, respectively, by alternatively activating the relays 42C and 42D, in the similar manner described above.

When an external voltage of the subscriber line is to be measured, the relay 42E is reset or deenergized under command of the processing circuit or CPU 11 to thereby position the relay contact 43E to a brake position leading to the ground instead of the power supply source 33. Except for these conditions, the measurement of the external voltage of the subscriber line can be effected similarly to the measurements of the insulation resistances through energization and deenergization of the relays 42A to 42D and the measuring procedures in the manner described above.

In the following, the principle on which the measurement of the insulation resistance ($R_L$) of the subscriber line is based will be described in more detail by referring to FIG. 4.

Figure 4:
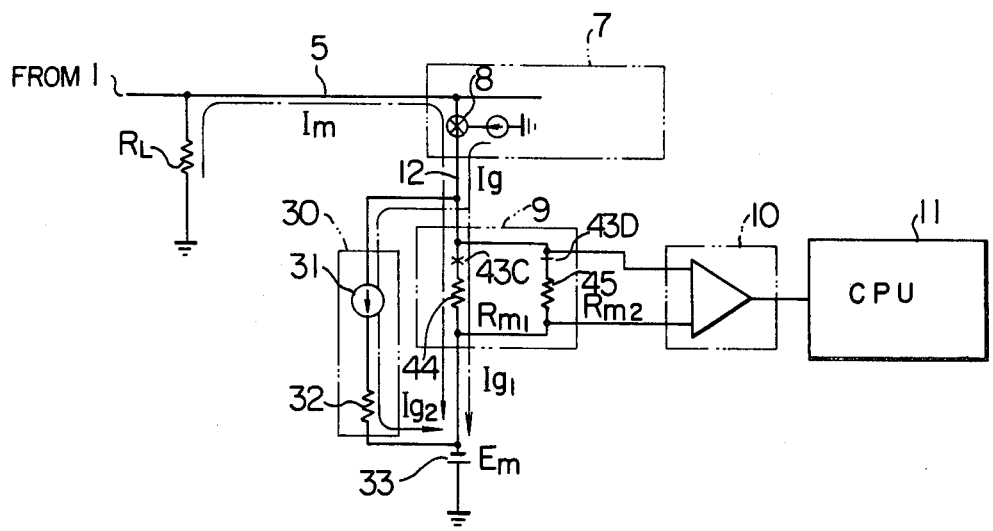
FIG. 4 illustrates the principle on which measurement of insulation resistance of a subscriber line according to the invention is based.

In FIG. 4, the same parts or elements as those shown in FIGS. 1 and 3 are denoted by the same reference symbols used in these figures. In FIG. 4, a reference symbol $E_m$ represents the voltage value of the power supply source 33 for measurement, $R_{m1}$ and $R_{m2}$ represent resistance values of the measuring resistors 44 and 45, respectively, and $R_L$ represents the value of the insulation resistance of the subscriber line 5. The symbol $I_m$ represents a measurement current flowing toward the power supply source ($E_m$) 33 from the insulation resistance $R_L$ of the subscriber line 5, $I_g$ represents a constant gate current for driving the test leading switch generally denoted by 8, $I_{g1}$ represents a part of the gate current conducted through the current change-over circuit 9, and $I_{g2}$ represents the other proportion of the gate current bypassed through the gate current bypassing circuit 30.

The principle of measuring the insulation resistance of the subscriber line will now be elucidated. The measurement current $I_m$ undergoes variation in dependence on the resistance value $R_{m1}$ or $R_{m2}$ of the resistor 44 or 45. However, the gate current $I_g$ remains invariable because this current $I_g$ is inherently a constant current. By taking advantage of this fact, the current $I_m$ is treated separately from the gate current $I_g$, so that the insulation resistance $R_L$ of the subscriber line is determined only on the basis of the measurement current $I_m$ by eliminating the contribution of the gate current $I_g$.

The voltage $V_{m1}$ measured by the measuring circuit 10 upon closure of the contact 43C, i.e. upon insertion of the resistor ($R_{m1}$) 44 is given by the expression:

$$V_{m1} = (I_m + I_{g1})R_{m1}.$$

When the forward voltage drop of the test leading switch 8 is represented by $V_F$, the above expression can be rewritten as follows:

$$V_{m1} = R_{m1} \cdot I_{g1} + \frac{(E_m - V_F - I_{g1} \cdot R_{m1})}{R_L + R_{m1}} \cdot R_{m1} \quad (1)$$

In a similar manner, the measurement voltage $V_{m2}$ measured by the measuring circuit 10 when the contact 43D is closed, i.e. when the resistor 45 of the value $R_{m2}$ is inserted is given by the following expression:

$$V_{m2} = R_{m2} \cdot I_{g1} + \frac{(E_m - V_F - I_{g1} \cdot R_{m2})}{R_L + R_{m2}} \cdot R_{m2} \quad (2)$$

In the above expressions (1) and (2), all the parameters except for the gate current $I_g$ and the insulation resistance $R_L$ are known. Accordingly, the insulation resistance $R_L$ of the subscriber line can be determined by solving the equations (1) and (2) as simultaneous linear equations, which can be accomplished through the arithmetic operation of the processing circuit or CPU 11.

Figure 5:
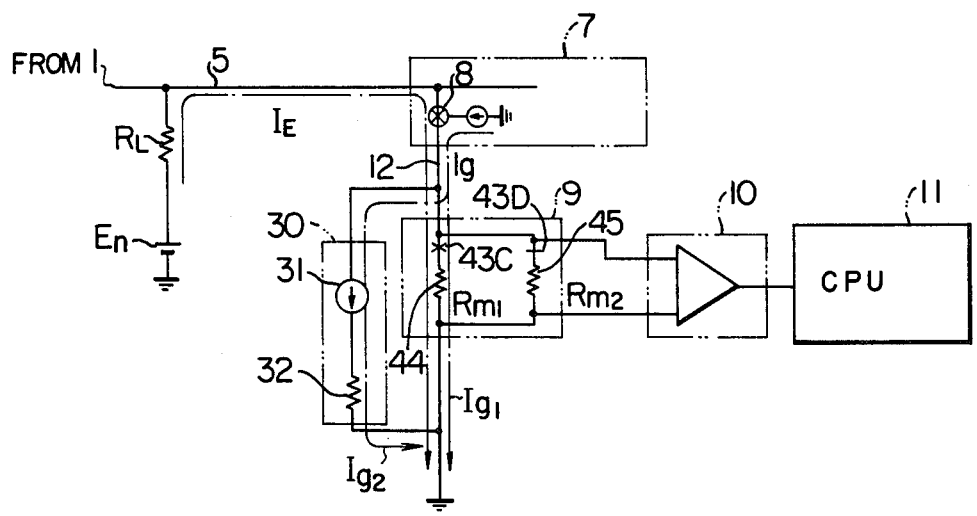
FIG. 5 illustrates the principle on which measurement of external voltage according to the invention is based.

Next, the principle underlying the measurement of the external voltage of the subscriber line will be described by referring to FIG. 5, in which same elements as those shown in FIG. 4 are labelled with the same numerals or symbols used in FIG. 4. A reference symbol $E_n$ represents a source of the external voltage. In actual practice, the external voltage $E_n$ may take either positive or negative polarity. In principle, the measurement of the external voltage $E_n$ is effected in a manner similar to the measurement of the insulation resistance ($R_L$) described above in conjunction with FIG. 4. A current $I_E$ to be measured is fed from the source of external voltage $E_n$ and flows along the current path extending through the lead-in wire 12 and the current change-over circuit 9 to the ground. In other words, only the ground potential is supplied from the testing apparatus, whereby the current $I_m$ fed under the external voltage $E_n$ is measured on the principle similar to that of the measurement of the insulation resistance.

Figure 6:
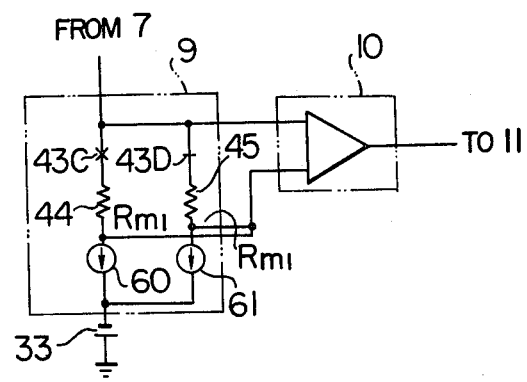
FIGS. 6 and 7 illustrate other exemplary embodiments of the present invention.
Figure 7:
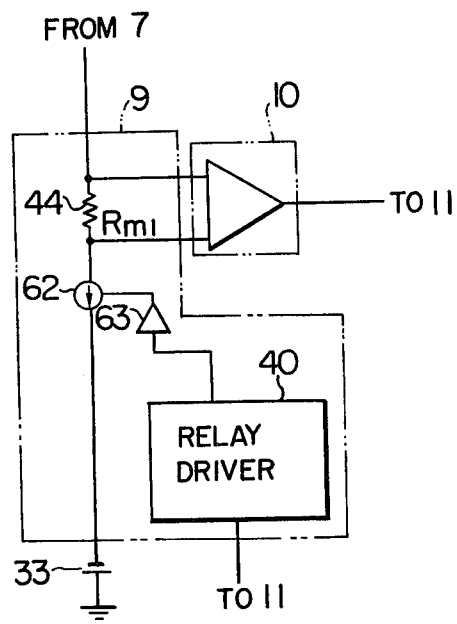

In the case of the exemplary embodiments described in the foregoing, the means for separating the gate current $I_g$ from the current $I_m$ or $I_E$ to be measured is so arranged that the resistors of the known resistance values $R_{m1}$ and $R_{m2}$ are exchangeably inserted in the current measuring loop with the measuring voltage being held constant to thereby allow the corresponding voltage drops $V_{m1}$ to $V_{m2}$ to be measured, respectively. However, the invention is not restricted to such arrangement. It is apparent that the invention can be realized in other ways. For example, first and second constant current circuits 60 and 61 having different constant current values, respectively, may be selectively and exchangeably inserted in the current measuring circuit 9 by means of the relay contacts 43C and 43D, as is shown in FIG. 6. Instead of resorting to the use of the first and the second current circuits 60 and 61, it is also possible to correspondingly vary the measuring voltage $E_m$. Further, referring to FIG. 7, a variable constant current circuit 62 which is capable of varying the value of the constant current may be provided in combination with a current varying command circuit 63 which can variably and selectively set the current of the variable constant current circuit 62 at a given constant value in accordance with the command issued from the relay driving circuit 40.

As will be appreciated from the foregoing description, it is now possible according to the teaching of the invention to perform the tests of the subscriber line without being subjected to any influence of the gate current ($I_g$) of the subscriber line by virtue of the inventive measuring arrangement which can treat the current ($I_m$, $I_E$) to be measured separately from the gate current ($I_g$) in the measurement. Thus, it is possible to execute the line testing with a high accuracy of measurement equivalent to the one attained through the use of metallic contacts known heretofore.

Additionally, the subscriber circuit 7 inclusive of the test leading switch 8 may be implemented in a monolithic structure, whereby the subscriber circuit 7 can be realized inexpensively in a much reduced size, while a low power consumption as well as a high package density can be accomplished. Further, due to the electronic implementation of the test leading switch 8, the time required for the measurements can be significantly decreased or shortened, while allowing the reliability in operation to be remarkably enhanced.

Although the invention requires indispensably the processing circuit or CPU 11 for its realization. However, the use of such processor does not mean disadvantage, but rather brings about an advantage that capability of the processor can be additionally made use of for improving the man-machine interface by displaying the digitally processed result of measurement on the CRT, for example.

What is claimed is:

1. A testing system for testing a subscriber line and a terminal equipment connected thereto by leading-in said subscriber line through a switch, comprising:
a semiconductor switch of a type driven by a constant current for electrically connecting said subscriber line to a testing apparatus; and
said testing apparatus comprising,
current changing means for changing a current fed from said subscriber line by way of said semiconductor switch, measuring means for measuring the values of current changed by said current changing means, and means for determining on the basis of the results of measurements effected by said measuring means a current value from which the constant current for driving said semiconductor switch is eliminated.

2. A testing system according to claim 1, further including a constant current bypass circuit for bypassing a part of the constant current for driving said semiconductor switch, said constant current being introduced from said semiconductor switch.

3. A subscriber line testing system, comprising:
a plurality of subscriber lines;
semiconductor switches each driven by a constant gate current and selected for leading a desired one of said subscriber lines for testing;
change-over means for changing over a value of current flowing through the subscriber line to be tested and introduced through the selected one of said semiconductor switches;
means for measuring the levels of the current fed through the selected one of said semiconductor switches and changed over by said change-over means, respectively.

4. A subscriber line testing system according to claim 3, further including processing means for determining a value of the current flowing through said subscriber line being tested through arithmetic operation on the basis of the current levels derived from said measuring means.

5. A subscriber line testing system according to claim 3, wherein said change-over means comprises a circuit for inserting selectively first and second resistors having different resistance values.

6. A subscriber line testing system according to claim 3, wherein said change-over means includes a circuit for inserting selectively first and second voltage sources having different voltage values, respectively.

7. A subscriber line testing system according to claim 3, wherein said measuring means includes a circuit for measuring voltage drops making appearance across first and second resistors, respectively, due to the current introduced through said selected semiconductor switch.

8. A subscriber line testing system according to claim 3, further including second change-over means provided in a flowing path of the current introduced from the subscriber line through said semiconductor switch for connecting exchangeably A-wire and B-wire of said subscriber line to said current level change-over means.

9. A subscriber line testing system according to claim 3, further including means for connecting one wire of said subscriber line to be tested to the ground.

10. A subscriber line testing system according to claim 3, further including switching means for terminating a current path of the current supplied through said semiconductor switch and said change-over means at the ground or a voltage source.

11. A subscriber line testing system according to claim 3, wherein said change-over means includes a circuit for inserting selectively first and second constant current circuits having different constant current values.

12. A subscriber line testing system according to claim 3, wherein said change-over means includes a circuit for selectively and variably setting the current value of a variable constant current circuit having a variable constant current value.

13. A subscriber line testing system according to claim 3, wherein a constant current bypass circuit is provided to bypass a part of said gate current for driving said semiconductor switch, said gate current being introduced by said switch.

* * * * *